(12) United States Patent
Applewhite et al.

(10) Patent No.: US 7,737,100 B2
(45) Date of Patent: Jun. 15, 2010

(54) COMPOSITIONS AND METHODS FOR PREVENTING AND TREATING CORROSION OF METAL SURFACES

(75) Inventors: LeeAnn Applewhite, Gainesville, FL (US); Mairym Samra, Rochester, MI (US); John P. Komar, Tampa, FL (US)

(73) Assignee: Transfer Technologies International Corporation, Tampa, FL (US)

( * ) Notice: Subject to any disclaimer, the term of this patent is extended or adjusted under 35 U.S.C. 154(b) by 102 days.

(21) Appl. No.: 11/369,521

(22) Filed: Mar. 6, 2006
(Under 37 CFR 1.47)

(65) Prior Publication Data
US 2006/0270578 A1 Nov. 30, 2006
US 2007/0099808 A2 May 3, 2007

Related U.S. Application Data

(63) Continuation-in-part of application No. 10/812,820, filed on Mar. 30, 2004, now Pat. No. 7,008,910.

(60) Provisional application No. 60/472,960, filed on May 23, 2003.

(51) Int. Cl.
*C11D 17/00* (2006.01)
(52) U.S. Cl. .............. 510/201; 510/202; 510/208; 510/210; 510/211
(58) Field of Classification Search ............. None
See application file for complete search history.

(56) References Cited

U.S. PATENT DOCUMENTS

| | | | |
|---|---|---|---|
| 5,141,555 A * | 8/1992 | Elepano .............. | 106/10 |
| 6,329,331 B1 * | 12/2001 | Aronson et al. ........ | 510/158 |
| 6,489,274 B1 * | 12/2002 | LeGrow et al. ........ | 510/122 |
| 7,264,847 B2 * | 9/2007 | Manos ................ | 427/409 |

* cited by examiner

*Primary Examiner*—Necholus Ogden, Jr.
(74) *Attorney, Agent, or Firm*—Lucas & Mercanti, LLP (57) ABSTRACT

Environmentally safe, cost effective, VOC-free compositions and methods for the prevention and treatment of corrosive processes in and on metal such as rust, flash rust and scale in a wide variety of industry sectors is provided. Compositions particularly well-suited for the long term prevention of rust and other corrosive processes may include an organic acid or salt thereof, a natural gum and/or wax and/or extracts or derivatives thereof, a gelling agent, and water.

10 Claims, 6 Drawing Sheets

COMPOSITIONS AND METHODS FOR PREVENTING AND TREATING CORROSION OF METAL SURFACES

CROSS REFERENCE APPLICATION

This application is a continuation-in-part of U.S. application Ser. No. 10/812,820, filed Mar. 30, 2004, which in turn claims priority to provisional U.S. Application Ser. No. 60/472,960, filed May 23, 2003. The contents of each of these applications are incorporated herein by reference in their entireties.

FIELD OF THE INVENTION

The present invention concerns compositions and methods for treating or preventing corrosive processes on metal surfaces.

BACKGROUND OF THE INVENTION

A recent government study concluded that the total annual cost due to corrosion in the U.S. alone is around $276 billion, representing nearly 3.1% of the U.S. Gross Domestic Product in 1998. Corrosion affects many different industry sectors, including infrastructure, utilities, transportation, production and manufacturing, and government. The infrastructure sector includes highway bridges, gas and liquid transmission pipelines, waterways and ports, hazardous materials storage, airports and railroads. The utility sector includes gas distribution, drinking water and sewer systems, electrical utilities and telecommunications. The transportation sector includes motor vehicles, ships, aircraft, railroad cars and hazardous materials transport. The production and manufacturing sector includes oil and gas exploration and production, mining, petroleum refining, chemical, petrochemical, pharmaceutical, pulp and paper, agriculture, food processing, electronics and home appliances. The government sector includes defense and nuclear waste storage. Corrosion is thus a serious and widespread problem for a variety of industries.

There have been numerous attempts to address corrosive processes, none of which have been especially satisfactory. For example, chromate, nitrate, and amine-based compositions typically degrade the performance of coatings and, therefore, should be removed prior to application of a coating layer. Water-based flash rust products are typically toxic and thus potentially hazardous to the environment. Handling and disposal of toxic materials can be difficult and expensive. In addition, the high pH of many of many water-based compositions can burn exposed skin and thus require extensive PPE (personal protection equipment) investment and usage. Moreover, if not completely removed prior to coating, residual film of water-based products can disrupt the performance of coatings. Furthermore, water soluble solutions are greatly affected by water quality variations such as pH and water hardness.

Preventative measures are likewise unavailing since they are typically only marginally effective and/or cumbersome. Dehumidification processes, for example, require large spaces, expensive equipment, extensive monitoring and forced ventilation systems. Blasting, cleaning and coating processes are also expensive and provide inconsistent results.

Accordingly, a significant need exists for environmentally safe, cost-effective compositions and methods for the prevention and treatment of corrosive processes in a variety of industry sectors, including infrastructure, utilities, transportation, production and manufacturing, and the government. The need for such compositions and methods includes those preventing flash rust processes over a relative short term as well as those preventing corrosive processes over an extended period of time.

SUMMARY OF THE INVENTION

Applicants have surprisingly discovered environmentally safe, cost effective compositions and methods for the prevention and treatment of corrosive processes in a wide variety of industry sectors. Such compositions are environmentally friendly in that they generally do not contain volatile organic compounds and as such are considered "VOC-free". Industry sectors for which these compounds and methods are useful include infrastructure, utilities, transportation, production and manufacturing, and the government. Corrosive processes include, for example, rust, flash rust, and scale formation.

One embodiment of the present invention provides aqueous non-toxic, anti-corrosive, rust-inhibiting compositions which may include organic acids such as sorbic acid, salts of sorbic acid and/or derivatives thereof such as potassium sorbate and extracts natural gums or waxes such as beeswax, vegetable wax and/or extracts or derivatives thereof.

Another embodiment of the present invention provides compositions which are particularly well-suited to prevent flash rust on metal surfaces, wherein such compositions may include organic acids such as sorbic acid, salts of sorbic acid and/or derivatives thereof such as potassium sorbate and natural gums or waxes such as beeswax, vegetable wax and/or extracts or derivatives thereof.

Yet another embodiment of the present invention provides compositions which are particularly well-suited for use as a bath or dip to prevent rusting of metal surfaces, wherein such compositions may include organic acids such as sorbic acid, salts of sorbic acid and/or derivatives thereof such as potassium sorbate and natural gums or waxes such as beeswax, vegetable wax and/or extracts or derivatives thereof.

Another embodiment of the present invention provides compositions which are particularly well-suited to operate as paint or coating preservatives which are effective in preventing rust formation on coated surfaces. Such compositions may include organic acids such as sorbic acid, salts of sorbic acid and/or derivatives thereof such as potassium sorbate and extracts natural gums or waxes such as beeswax, vegetable wax and/or extracts or derivatives thereof.

Still other embodiments of the present invention provide methods of making and using compositions useful as flash rust inhibitors, as bath or dips and as paint preservatives or additives Other embodiments of the present invention provides compositions and methods that are effective in long term rust inhibition.

DETAILED DESCRIPTION

The present invention provides environmentally safe, cost effective compositions and methods for the prevention and treatment of corrosive processes. Compositions and methods according to the present invention may be used in a wide variety of applications and in a wide variety of industry sectors. Such industry sectors include infrastructure, utilities, transportation, production and manufacturing, and the government. Specific applications include, for example, use of compositions as flash rust inhibitors, dips, and paint or other coating additives. Compositions according to the present invention generally will not contain volatile organic chemicals ("VOC-free") and are thus more safely handled and disposed of than those containing such chemicals.

Embodiments of the present invention provide anti-corrosive compositions which may include organic acids such as sorbic acid, salts of sorbic acid and/or derivatives thereof such as potassium sorbate and sodium sorbate, and natural gums or waxes such as beeswax, vegetable wax and/or extracts or derivatives thereof, and water.

Organic acids and their derivatives also may include but are not limited to, for example lactic and citric acid and their potassium and sodium salts.

Natural gums or waxes may include but are not limited to, for example, paraffin, peel wax, guar gum, xanthan gum, guar gum, and carrageenan.

One embodiment of the present invention includes compositions and methods of using compositions which may include from about 0.001 to about 0.4% beeswax extract, from about 0.2 to about 4.0% sorbic acid and/or potassium sorbate, all by weight, with the balance water, preferably purified water.

In another embodiment the present invention the present invention provides compositions which may include about 0.007% beeswax extract, about 0.33% sorbic acid and/or potassium sorbate, all by weight, and the balance purified water.

The present invention also includes methods of making and using these compositions. Methods of making anti-corrosive compositions may include heating an amount of water, adding natural gums or waxes such as beeswax, vegetable wax and/or extracts or derivatives thereof to the heated water, adding organic acids such as sorbic acid, salts of sorbic acid and/or derivatives thereof such as potassium sorbate to the heated water and gum and/or wax and/or wax extract mixture, mixing the resulting composition for a period of time, transferring the mixed composition to a product container, and then adding a balance of water.

Embodiments of the present invention thus may include hydrocarbons, esters, acids, alcohols and saponified fatty acids, various combinations of which may be derived as extracts of beeswax or other waxes or gums.

In certain embodiments carbon chains $C_{24}$ and smaller may comprise the majority of fatty acids retained in the composition. In some embodiments, only a fraction of the beeswax or vegetable wax or extracts thereof is retained in the final compositions. Phenols, acids, hydrocarbons, esters, acids, alcohols and saponified fatty acids derived from beeswax or vegetable waxes may be removed from the compositions by, for example, filtration. Likewise, high-melting point paraffins and other components that could interfere with subsequent coatings may be removed during the manufacturing process in the same manner.

Without being bound by a particular theory, compositions according to the present invention are believed to inhibit corrosion in several ways. A synergistic effect is provided by various components in such compositions which enhances overall effectiveness. As an anti-oxidant such compositions scavenge oxygen, which under normal conditions promotes corrosion on ferrous and non-ferrous materials. By forming an oxygen barrier the material eliminates or reduces corrosion. Ions of short chain fatty acids are believed to react with the active cathodic sites on the metal surfaces to neutralize the active sites. This action extends the effectiveness of the composition as a corrosive inhibitor. Without this activity, the effectiveness of the composition would be greatly reduced as the oxygen scavenging function is depleted rapidly.

In use, compositions according to embodiments of the present invention are capable of being applied in a layer less than about 350 nanometers in thickness. Surfaces upon which such compositions have been applied may be successfully coated with a finishing material such as paint or plating. Such compositions also may promote coating adhesion and the residual wax components are not detrimental to product finishing. Further, saponification of wax fatty acids produces water soluble compounds that dissolve when contacted with water or other polar solvent. This allows for top coating without preliminary removal of the soluble compounds. Embodiments of the present invention are generally not intended to be a final top coat or permanent barrier. That is, such compositions are generally capable of inhibiting corrosive processes in the longer term when applied over substantially the entire metal surface prior to painting or otherwise coating the surface.

Embodiments of the present invention intended for use as long term inhibitors of rust generally contain organic acids such as sorbic acid, salts of sorbic acid and/or derivatives thereof such as potassium sorbate and sodium sorbate, and natural gums or waxes such as beeswax, vegetable wax and/or extracts or derivatives thereof, and water, preferably purified water along with gelling agents. Vegetable waxes may include but are not limited to those such as carnauba.

Gelling agents include the family of pseudoplastics. Specific gelling agents include, but are not limited to, carrageenan, gellan gum, pectin, welan gum, and xanthan gum. Carrageenan products are a family of sulfated polysaccharides extracted from certain species of red seaweed. Gellan gum is a polysaccharide manufactured by microbial fermentation of the *Sphingomonas elodea* microorganism. Pectin products are a family of partially methyl esterified polysaccharides produced from citrus peel and sugar beet pulp by extraction and controlled de-esterification. Welan gum is an anionic polysaccharide. Finally, industrial grade xanthan gum is a high molecular weight, anionic, polysaccharide produced in a pure culture fermentation process. Gelling agents also include, for example, hydroxypropylcellulose and hydroxymethylcellulose-based agents and those agents known by the trade names Carbopol, Klucel and Natrosol.

Rheology modifiers may be used in compositions intended for long term use. The types and amounts will depend on the desired flow properties. Rheology modifiers include, for example, natural soluble polymers and may be non-ionic or anionic.

Methods of making and using compositions intended for long term use are also provided and are discussed in more detail below.

Flash Rust Inhibitor

The present invention provides compositions and methods which are particularly effective in preventing and treating flash rust and associated processes. Such compositions are superior to conventional flash rust inhibitors which tend to leave a residual film on the treated surface and potentially affect coating adhesion.

As a flash rust inhibitor, embodiments of the present invention may include organic acids such as sorbic acid, salts of sorbic acid and/or derivatives thereof such as potassium sorbate and natural gums or waxes such as beeswax, vegetable wax and/or extracts or derivatives thereof, and water. In certain embodiments, such compositions also may include surfactants.

In other embodiments, the present invention may include from about 0.001 to about 0.1% beeswax extract and from about 0.2 to about 4.0% potassium sorbate, all by weight.

In still other embodiments, the compositions may include about 0.007% beeswax extract and about 0.33% potassium sorbate with the balance purified water, all by weight.

Alkalinity of the product provided by potassium sorbate, for example, promotes the extraction of several components from wax. As a processing aid potassium hydroxide may be used to reach desired pH levels to promote the saponification of fatty acids. Alternatively, sorbic acid, for example, and potassium hydroxide or other suitable alkalizer may be used to produce the same end products as potassium sorbate or its various salts and saponified wax derivatives.

The present invention also includes methods of making compositions which can be used as flash rust inhibitors. Such methods may include heating an amount of water, adding natural gums or waxes such as beeswax, vegetable wax and/or extracts or derivatives thereof to the heated water, adding organic acids such as sorbic acid, salts of sorbic acid and/or derivatives thereof such as potassium sorbate to the heated water and gum and/or wax and/or wax extract mixture, mixing the resulting composition and then adding a balance of water.

Other methods of making compositions which can be used as a flash rust inhibitor may include heating an amount of water to at least about 165° F., adding from about 0.001 to about 0.1% natural gums or waxes such as beeswax, vegetable wax and/or extracts or derivatives thereof to the heated water, adding from about 0.2 to about 4.0% organic acid such as sorbic acid, salts of sorbic acid and/or derivatives thereof such as potassium sorbate to the heated water and gum and/or wax and/or wax extract mixture, mixing the resulting composition, transferring the mixed composition to a product container, and then adding a balance of water.

A preferred method for producing the composition of the present invention as a flash rust inhibitor includes heating about 10.7% purified water to at least about 175° F. to about 185° F., preferably about 180° F.; adding about 0.007% beeswax extract and mixing for about five (5) minutes; adding about 0.33% potassium sorbate and mixing for about ten (10) minutes; transferring the composition to a product container and adding about 89% purified water.

Compositions used as flash rust inhibitors generally are clear solutions and have a pH from about 6.0 to about 9.0 with a preferred range of about 6.5 to about 7.5 and a most preferred pH of about 7.0. Conductivity of such embodiments generally range from about 1.7 ms/cm to about 2.3 ms/cm, preferably about 2.0 ms/cm. Such compositions are generally non-flammable and can have a shelf life of up to a year.

Embodiments of the present invention used as flash rust inhibitors have been shown to have surprisingly beneficial properties. Such properties include the prevention of flash rusting for up to 48 hours and a non-existent or minimal impact on the performance of subsequent coatings. Such compositions may be used alone or in combination with conventional coatings such as paints and sealers. When used alone such compositions may be formulated to be used "as is" without the need to dilute the composition. Since it is not necessary to dilute these compositions, the potential impact of water quality and the need to account for varying dilution ratios among products can be eliminated. In addition, these compositions generally have no significant odor and, as mentioned previously, generally will not contain volatile organic compounds and as such are considered VOC-free.

Compositions according to the present invention preferably do not substantially affect the adhesive properties of subsequently applied coatings. In preferred embodiments the adhesive properties of subsequently applied coatings is reduced by about 10% or less compared to coatings applied without a rust inhibitor undercoating. Compositions according to the present invention also do not significantly prohibit the application of additional coatings (e.g., require more than about 10% extra additional coating). Compositions of this invention most preferably do not substantively affect the application of coatings to metal (e.g., substantially the same additional coating affect can be achieved with or without the use of compositions of this invention (although simple variation in the application method, amount or type of the additional coating may be required)).

In use, flash rust inhibitors used on smooth surfaces may cover about 300 to 600 square feet per gallon of the composition and be applied at a pressure of about 500 to 2500 psi using, for example, an airless sprayer. These concentrations and pressures may be varied depending on need. On rough surfaces the pressure may be 2500 psi or higher and the coverage area reduced to about 200 to 400 square feet per gallon. Again, these concentrations and pressures may be varied depending on precise conditions. Best results are achieved when the surface to be treated is cleared of contamination prior to treatment.

Without being bound by a particular theory, it is believed that embodiments of the invention used as rust inhibitors contain positively and negatively charged components which readily combine with positively and negatively charged sites on the surface of treated metals. Regardless of the precise mechanism of action, as shown in more detail below, a significant reduction in corrosion potential results.

Experimental Results of Flash Rust Compositions

As discussed below, the effectiveness of a representative embodiment used as flash rust inhibitors was confirmed through the use of standard and PATTI adhesion testing, solvent testing and salt spray resistance testing. The tested compositions included about 0.007% beeswax extract, about 0.33% potassium sorbate, with the balance purified water, all by weight.

Figure 1:
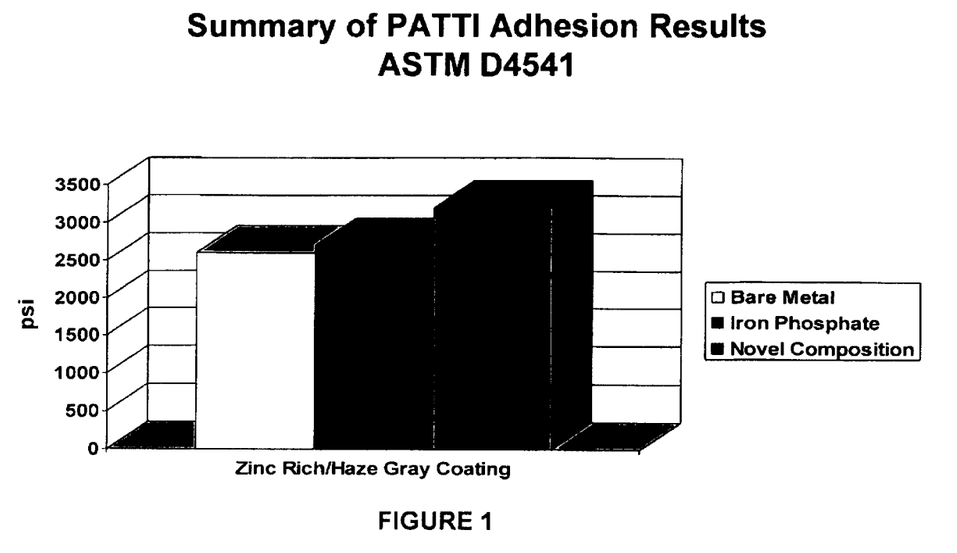
FIG. 1 provides ASTM D4541 PATTI adhesion testing results comparing an embodiment of the present invention to an iron phosphate-based composition to a bare metal control (upon which no rust inhibitor had been applied) after application of a conventional zinc rich/haze gray coating on each.

As shown in FIG. 1, adhesion tests were conducted pursuant to ASTM (American Society of Testing and Materials) D4541 (Standard Test Method for Pull-Off Strength of Coatings Using Portable Adhesion Testers) comparing (1) bare metal coated with a conventional zinc rich/haze gray coating upon which no rust inhibitor had been first applied; (2) bare metal first treated with a conventional iron phosphate-based rust inhibitor followed by application of a conventional zinc rich/haze gray coating; and (3) bare metal first treated with an embodiment of the present invention followed by application of a conventional zinc rich/haze gray coating. As shown in FIG. 1, this adhesion test shows superior results for the metal treated first with an embodiment of the present invention as compared to both the bare metal control and the metal treated first with an iron phosphate-based product.

Figure 2:
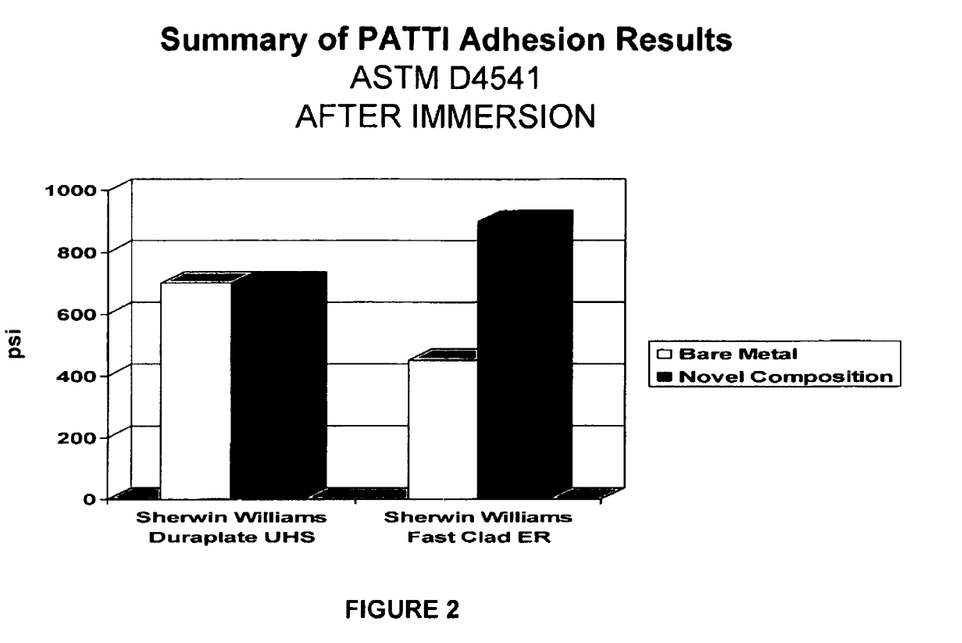
FIG. 2 provides ASTM D4541 PATTI adhesion testing results after immersion comparing an embodiment of the present invention to a bare metal control (upon which no rust inhibitor had been applied) after application of a conventional coating on each.

As shown in FIG. 2, PATTI (Pneumatic Adhesion Tensile Testing) "after immersion" adhesion tests were conducted pursuant to ASTM D4541 (Standard Test Method for Pull-Off Strength comparing (1) bare metal coated with two types of conventional commercial coatings upon which no rust inhibitor had been first applied; and (2) bare metal first treated with an embodiment of the present invention followed by application of the same two conventional commercial coatings. As shown in FIG. 2 this adhesion test shows overall superior results for the metal first treated with an embodiment of the present invention as compared the bare metal upon which no rust inhibitor had been first applied.

Figure 3:
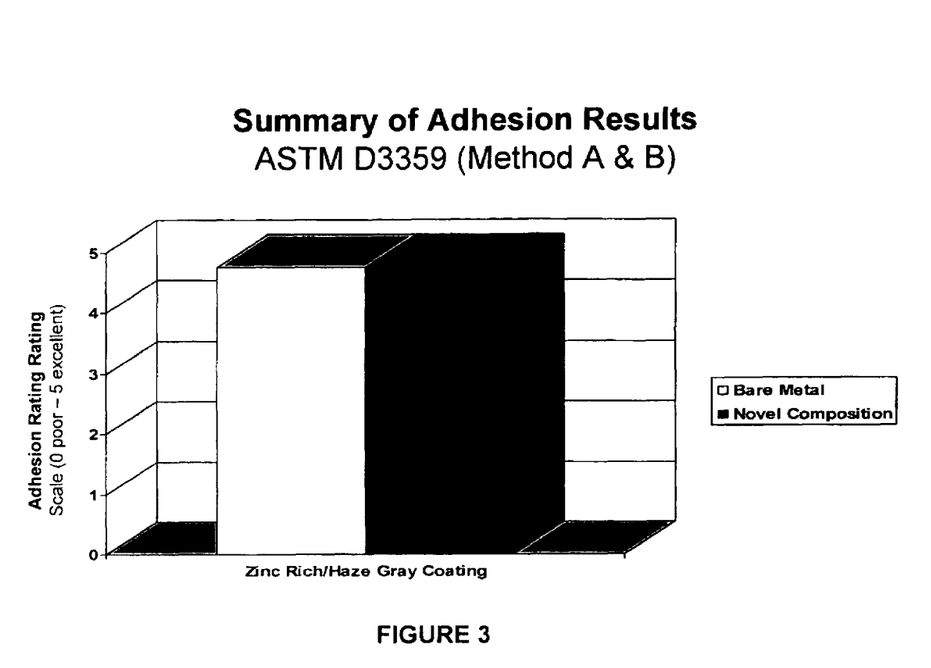
FIG. 3 provides ASTM D3359 adhesion testing results comparing an embodiment of the present invention to a bare metal control (upon which no rust inhibitor had been applied) after application of a conventional zinc rich/haze gray coating on each.

As shown in FIG. 3, adhesion tests were conducted pursuant to ASTM D3359 (Standard Test Method for Measuring Adhesion by Tape Test) comparing (1) bare metal coated with a conventional zinc rich/haze gray coating upon which no rust inhibitor had been first applied; and (2) bare metal first treated with an embodiment of the present invention followed by application of a conventional zinc rich/haze gray coating. As shown in FIG. 3 this adhesion test shows comparable results for the metal treated first with an embodiment of the present invention as compared to the bare metal control.

Figure 4:
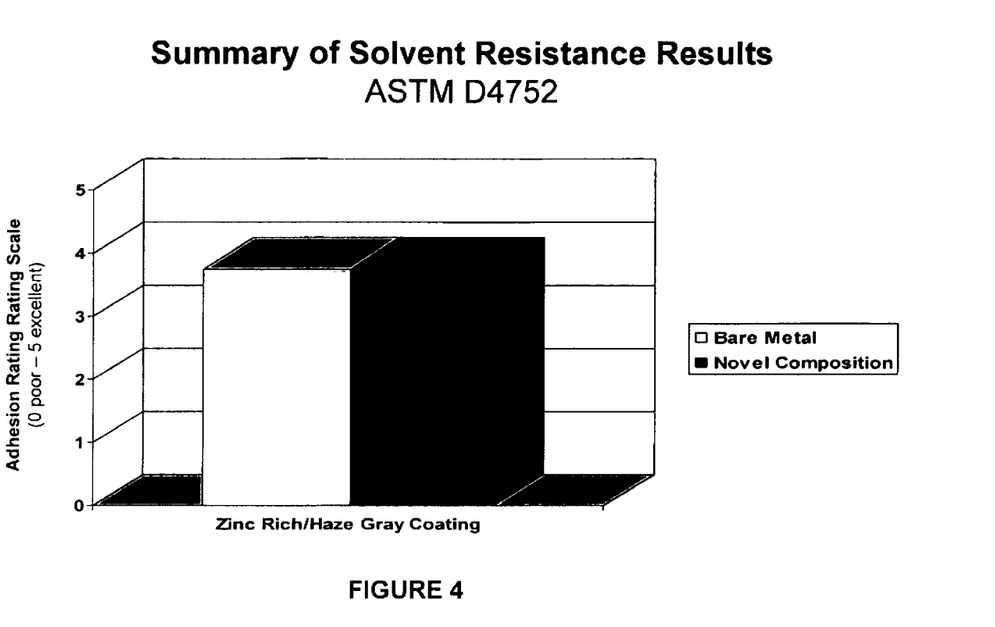
FIG. 4 provides ASTM D4752 solvent resistance results comparing an embodiment of the present invention to a bare metal control (upon which no rust inhibitor had been applied) after application of a conventional zinc rich/haze gray coating on each.

As shown in FIG. 4, testing pursuant to ASTM D4752 (Standard Test Method for Measuring MEK (methyl ethyl ketone) Resistance of Ethyl Silicate (Inorganic) Zinc-Rich Primers by Solvent Rub) was conducted to compare the effects on adhesion between (1) bare metal coated with a conventional zinc rich/haze gray coating upon which no rust inhibitor had been first applied; and (2) bare metal first treated with an embodiment of the present invention followed by application of a conventional zinc rich/haze gray coating. As shown in FIG. 4 this test shows comparable results for the metal treated first with an embodiment of the present invention as compared to the bare metal control.

Figure 5:
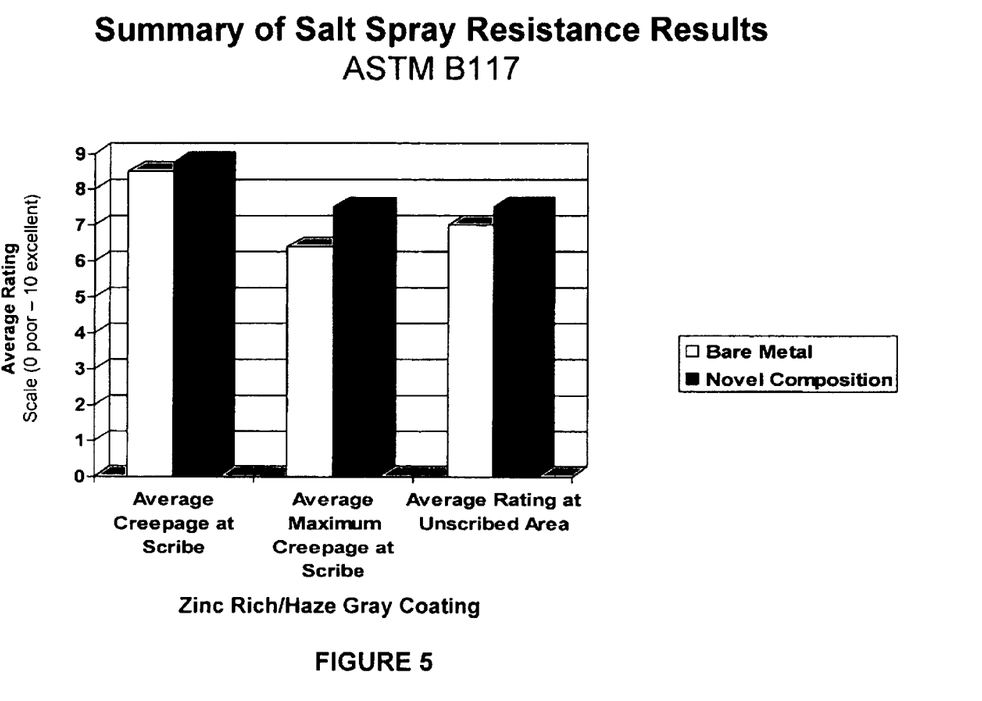
FIG. 5 provides ASTM B117 salt spray resistance results (average rating) comparing an embodiment of the present invention to a bare metal control (upon which no rust inhibitor had been applied) after application of a conventional zinc rich/haze gray coating on each.
Figure 6:
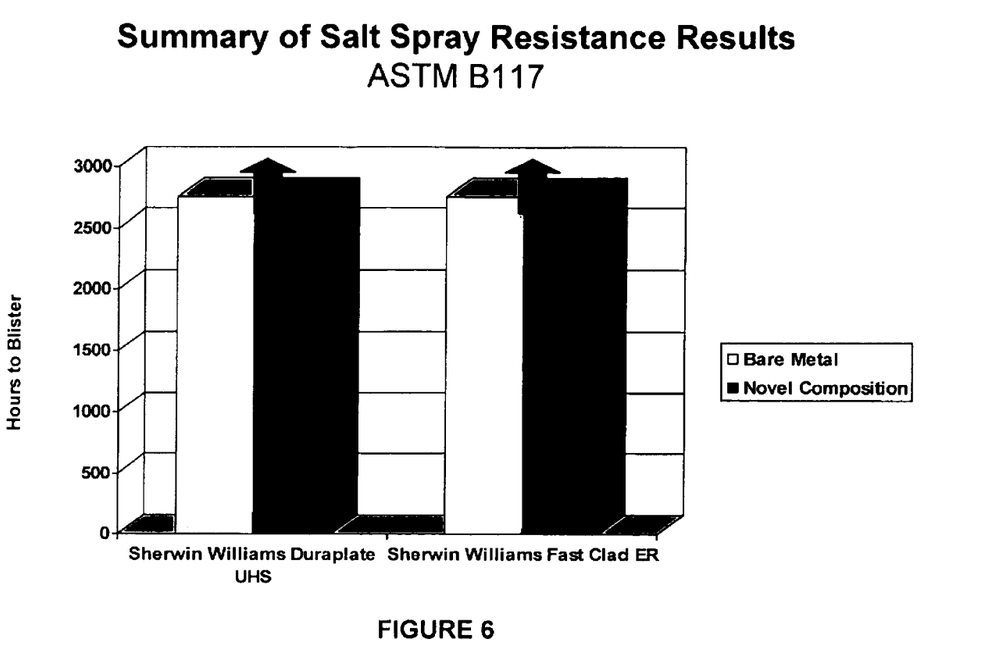
FIG. 6 provides ASTM B117 salt spray resistance results (hours to blister) comparing an embodiment of the present invention to a bare metal control (upon which no rust inhibitor had been applied) after application of a conventional coating on each.

As shown in FIG. 5, corrosion testing pursuant to ASTM B117 (Standard Practice for Operating Salt Spray (Fog) Apparatus) was conducted to compare (1) bare metal coated with a conventional zinc rich/haze gray coating upon which no rust inhibitor had been first applied; and (2) bare metal first treated with an embodiment of the present invention followed by application of a conventional zinc rich/haze gray coating. As shown in FIG. 5 this test shows superior results for the metal treated first with an embodiment of the present invention as compared to the bare metal control in all three categories (i.e., average creepage at scribe, average maximum creepage at scribe and average rating at unscribed areas As shown in FIG. 6, corrosion testing pursuant to ASTM B117 (Standard Practice for Operating Salt Spray (Fog) Apparatus) was conducted to compare blistering results between (1) bare metal coated with two types of conventional commercial coatings upon which no rust inhibitor had been first applied; and (2) bare metal first treated with an embodiment of the present invention followed by application of the same two conventional commercial coatings. As shown in FIG. 6 this test shows comparable resistance to blistering between the metal treated first with an embodiment of the present invention as compared to the bare metal control.

As shown in the above-described tests, embodiments of the present invention show excellent performance with respect to standard and PATTI adhesion and solvent and spray resistance compared to bare metal controls and to conventional rust inhibitors.

Bath or Dip

The present invention also provides compositions which are particularly useful as bath or dip solutions. Such compositions may include organic acids such as sorbic acid, salts of sorbic acid and/or extracts or derivatives thereof such as potassium sorbate and natural gums or waxes such as beeswax, vegetable wax and/or extracts or derivatives thereof, and water. In certain embodiments, such compositions also may include surfactants.

In bath or dip embodiments, the compositions may include from about 0.02 to about 0.1% beeswax extract, from about 2.0 to about 4.0% potassium sorbate, with the balance purified water, all by weight. In other bath or dip embodiments, the compositions may include about 0.062% beeswax extract and about 3.0% potassium sorbate, with the balance purified water, all by weight. In certain embodiments, such compositions also may include surfactants.

The chemical properties of bath or dip compositions may include a pH of about 6.0 to about 9.0 with a preferred range of about 6.5 to about 7.5 and a most preferred pH of about 7.0 and conductivity of from about 1.7 ms/cm to about 2.3 ms/cm, preferably about 2.0 ms/cm.

Methods of making bath or dip embodiments of the present invention include heating an amount of water, adding natural gums or waxes such as beeswax, vegetable wax and/or extracts or derivatives thereof to the heated water, adding organic acids such as sorbic acid, salts of sorbic acid and/or extracts or derivatives thereof such as potassium sorbate to the heated water and gum and/or wax and/or wax extract mixture, mixing the resulting composition for a period of time, transferring the mixed composition to a product container, and then adding a balance of water Other methods of making compositions which can be used as a bath or dip according to the present invention may include heating an amount of water to at least about 165° F., adding from about 0.02 to about 0.1% natural gums or waxes such as beeswax, vegetable wax and/or extracts or derivatives thereof to the heated water, adding from about 2.0 to about 4.0% organic acid such as sorbic acid, salts of sorbic acid and/or derivatives thereof such as potassium sorbate to the heated water and gum and/or wax and/or wax extract mixture, mixing the resulting composition, transferring the mixed composition to a product container, and then adding a balance of water.

Another method for making a bath and dip according to the present invention includes adding about 97% purified water and heating the water up to about 175° F. to about 185° F., preferably about 180° F.; adding about 0.062% beeswax extract and mixing for about five (5) minutes; adding about 3.0% potassium sorbate and mixing for about ten (10) minutes and transferring the composition to a product container Paint Preservative or Additive The present invention also provides compositions which are particularly useful as a paint preservatives or additives. Such compositions may include organic acids such as sorbic acid, salts of sorbic acid and/or derivatives thereof such as potassium sorbate and natural gums or waxes such as beeswax, vegetable wax and/or extracts or derivatives thereof, and water. In certain embodiments, such compositions also may include surfactants.

When used as a paint preservative or additive, the composition may include from about 0.1 to about 1.0% beeswax extract, from about 5 to about 15% potassium sorbate, with the balance purified water, all by weight. In other paint preservative or additive embodiments, the compositions include about 0.35% beeswax extract and about 11% potassium sorbate.

Methods of making paint preservatives or additive embodiments of the present invention include heating an amount of water, adding natural gums or waxes such as beeswax, vegetable wax and/or extracts or derivatives thereof to the heated water, adding organic acids such as sorbic acid, salts of sorbic acid and/or derivatives thereof such as potassium sorbate to the heated water and gum and/or wax and/or wax extract mixture, mixing the resulting composition for a period of time, transferring the mixed composition to a product container, and then adding a balance of water.

Other methods of making compositions which can be used as a paint preservative or additive according to the present invention may include heating an amount of water to at least about 165° F., adding from about 0.1 to about 1.0% natural gums or waxes such as beeswax, vegetable wax and/or extracts or derivatives thereof to the heated water, adding from about 5 to about 15% organic acid such as sorbic acid, salts of sorbic acid and/or derivatives thereof such as potassium sorbate to the heated water and gum and/or wax and/or wax extract mixture, mixing the resulting composition, transferring the mixed composition to a product container, and then adding a balance of water.

A preferred method for producing the composition of the present invention used as a paint preservative or additive comprises heating about 78.6% purified water from at least about 175° F. to about 185° F., preferably about 180° F.; adding about 0.36% beeswax extract and mixing for about 5 minutes, adding about 11% potassium sorbate and mixing for about ten (10) minutes and transferring the composition to a product container.

Chemical properties of embodiments of the present invention used as paint preservatives or additives may include a pH of about 7.0 to about 10.0 with a preferred range from about 8.0 to about 9.0 and a most preferred pH of about 8.5. Such embodiments also may have conductivity from about 10 ms/cm to about 30 ms/cm, and preferably about 20 ms/cm.

Long Term Rust Inhibitor

The present invention also provides compositions and methods for the long term prevention of rust. Such compositions are typically environmentally safe, biodegradable, non-hazardous, non-flammable and non-toxic. Such compositions are also typically odor free, VOC-free, water based and require no dilution As mentioned above, long term rust inhibitors generally include organic acids such as sorbic acid, salts of sorbic acid and/or derivatives thereof such as potassium sorbate and sodium sorbate, and natural gums or waxes such as beeswax, vegetable wax and/or extracts or derivatives thereof, and water, preferably purified water along with gelling agents, such as hydroxypropylcellulose and hydroxymethylcellulose-based agents or those agents know by the trade names Carbopol, Klucel and Natrosol. Rheology modifiers also may be used in compositions intended for long term use. The types and amounts will depend on the desired flow properties.

Base compositions for long term use may include, for example, from about 0.001% to about 0.2% beeswax extract and from about 0.25 to about 6.0% potassium sorbate, with the balance water, preferably purified water, all by weight. Gelling agents may be added to the base composition in amounts ranging from about 0.5% to about 10% by weight of the base composition, to form the final product.

In another embodiment, the base compositions for long term use may include, for example, from about 0.01 to about 0.1% beeswax extract and from about 1.0 to about 5.0% potassium sorbate, with the balance water, preferably purified water, all by weight. Gelling agents may be added to the base composition in amounts ranging from about 1.0 to about 4.0% by weight of the base composition, to form the final product.

In yet another embodiment, the base compositions for long term use may include, for example, about 0.06 to about 0.08% beeswax extract and from about 2.0 to about 4.0% potassium sorbate, with the balance water, preferably purified water, all by weight. Gelling agents may be added to the base composition in amounts ranging from about 2.0 to about 3.0% by weight of the base composition, to form the final product Long term rust inhibitors also may include anti-blocking agents which minimize adhesion between two surfaces under the influence of, for example, temperature, relative humidity and/or pressure. Additional waxes, including but not limited to, for example, carnauba, may be included in such compositions to prevent such adhesion. For example, the inclusion of such a wax is useful when coated items are stacked, one upon another, prior to complete drying of the coating. Waxes, such as carauba, can prevent such items from sticking together. Amounts of such blocking agents will depend on the specific conditions under which items are, for example, coated and stored.

Methods of making long term rust inhibitors according to the present invention include heating an amount of water, adding natural gums or waxes such as beeswax, vegetable wax and/or extracts or derivatives thereof to the heated water, adding organic acids such as sorbic acid, salts of sorbic acid and/or extracts or derivatives thereof such as potassium sorbate to the heated water and gum or wax mixture, mixing the resulting composition for a period of time, transferring the mixed composition to a product container, and then adding a balance of water to form a base compositions. Gelling agents then may be added to base compositions. In some embodiments, anti-blocking agents may be added to base compositions either before or after, but preferably before gelling agents are added.

Other methods of making compositions which can be used as long term rust inhibitors according to the present invention may include heating an amount of water to at least about 165° F., adding from about 0.0011 to about 0.2% natural gums or waxes such as beeswax, vegetable wax and/or extracts or derivatives thereof to the heated water, adding from about 0.25 to about 6% organic acid such as sorbic acid, salts of sorbic acid and/or derivatives thereof such as potassium sorbate to the heated water and gum or wax mixture, mixing the resulting composition, transferring the mixed composition to a product container, and then adding a balance of water to form a base composition. To the base composition gelling agents may be added in amounts ranging from about 0.5 to about 10%.

A preferred method for producing the composition of the present invention used as a paint preservative or additive comprises heating an amount of purified water to at least about 175° F.; adding from about 0.01 to about 0.1% beeswax and mixing for about 5 minutes, adding from about 2.0 to about 4.0% potassium sorbate and mixing for about ten (10) minutes and transferring the composition to a product container to form a base composition. To the base composition gelling agents may be added in amounts ranging from about 1.0 to about 4.0%.

In use, the composition may be applied with a sprayer to cover the surface of the object to be protected. The thickness of the coating will depend on the particular application and desired performance. The composition may be reapplied depending on the needs of the user. Long term rust prevention should be provided for at least four months under most conditions.

The present invention has been described with reference to particular embodiments. It should be noted, however, that variations and modifications may be made without departing from the spirit and scope of the invention.

What is claimed is:

1. A method for the long term prevention or treatment of corrosion on a metal surface comprising applying to the metal surface a composition consisting of water, one or more natural waxes, potassium sorbate, and one or more gelling agents, wherein said potassium sorbate comprises from about 0.25% to about 6.0% by weight of the total weight of the composition.

2. The method of claim 1, wherein the one or more natural waxes comprises beeswax.

3. The method of claim 1, wherein the gelling agent is selected from the group consisting of gellan gum, pectin, whelan gum, xanthan gum, hydroxypropylcellulose, hydroxymethylcellulose and any combination thereof.

4. The method of claim 3, wherein the gelling agent comprises hydroxypropylcellulose.

5. The method of claim 1, wherein the gelling agent is present in an amount from about 0.5 to about 10% by weight of the total weight of the composition.

6. The method of claim 3, wherein the gelling agent is present in an amount from about 0.5 to about 10% by weight of the total weight of the composition.

7. The method of claim 4, wherein the gelling agent is present in an amount from about 0.5 to about 10% by weight of the total weight of the composition.

8. The method of claim 1, wherein application of said composition inhibits corrosion for at least four months after application to a metal surface.

9. The method of claim 1, wherein the pH of said composition is from about 6.0 to about 9.0.

10. The composition of claim 9, wherein the pH of said composition is from about 6.5 to about 7.5.

* * * * *